United States Patent [19]
Rawicz et al.

[11] Patent Number: 6,111,650
[45] Date of Patent: Aug. 29, 2000

[54] METHOD AND APPARATUS FOR COLOR MATCHING OF SLIGHTLY COLORED TRANSLUCENT OBJECTS SUCH AS TEETH AND DENTAL PROSTHESIS, IN PARTICULAR

[76] Inventors: Andrew Rawicz, 7216 Hewitt Str., Burnaby, Canada, V5A 3M2; Ivan Melnyk, 1507-6595 Willingdon Ave., Burnaby, Canada, V5H 4E5; Romuald Lakowski, 3783 West 24, Vancouver, Canada, V6S 1L7

[21] Appl. No.: 08/919,589

[22] Filed: Aug. 14, 1997

[51] Int. Cl.$^7$ ....................................................... G01J 3/46
[52] U.S. Cl. ............................................................. 356/402
[58] Field of Search .......................... 356/402–411, 440, 356/432–436, 414, 319, 303, 326, 328, 418; 250/226, 227.11–227.32, 573–576; 385/12, 13; 433/29, 26, 203.1, 215; 364/413.28

[56] References Cited

U.S. PATENT DOCUMENTS

| | | |
|---|---|---|
| 3,327,584 | 6/1967 | Kissinger . |
| 3,910,677 | 10/1975 | Becker et al. . |
| 4,290,433 | 9/1981 | Alfano . |
| 4,654,794 | 3/1987 | O'Brien . |
| 4,836,674 | 6/1989 | Lequime et al. . |
| 4,861,131 | 8/1989 | Bols et al. . |
| 4,881,811 | 11/1989 | O'Brien . |
| 5,303,036 | 4/1994 | McLachlan et al. . |
| 5,383,020 | 1/1995 | Viellefosse . |
| 5,428,450 | 6/1995 | Viellefosse et al. . |
| 5,759,030 | 6/1998 | Jung et al. . |
| 5,851,113 | 12/1998 | Jung et al. . |

FOREIGN PATENT DOCUMENTS

| | | |
|---|---|---|
| 3 411 184 A1 | 10/1985 | Germany . |
| 19534517 | 3/1997 | Germany . |

OTHER PUBLICATIONS

Rhodes et al "Color Recognition Sensing for Intelligent Process Automation and Control," Advances In Instrumentation and Control 46 (1991) Part 1.

Vollman, Dr. Markus, "Vitapan 3D–Master: Theory and Practice", QDT 1999, pp. 43–53.

Schwabacher, Dr. William B., "Interdependence of the Hue, Value, and Chroma in the Middle Site of Anterior Human Teeth", Journal of Prosthodontics, vol. 3 No. 4, Dec. 1994, pp. 188–192.

Douglas, Dr. R. Duane, "Precision of in vivo colorimetric assessments of teeth", The Journal of Prosthetic Dentistry, vol. 77, No. 5, May 1997, pp. 464–470.

S. Bergen et al., "Dental Operatory Lighting and Tooth Color Discrimination", JADA, vol. 94, Jan. 1977, pp. 130–134.

M. Macentee et al., "Instrumental Colour Measurement of Vital and Extracted Human Teeth", vol. 8, J. Oral Rehabil., 1981, pp. 203–208.

R. Goodkind, "A Comparison of Chromascan and Spectroscopic Color Measurements of 100 Natural Teeth", J. Prosthet. Dent., vol. 53, pp. 105–109, 1985.

(List continued on next page.)

*Primary Examiner*—K. P. Hantis
*Attorney, Agent, or Firm*—Nixon Peabody LLP

[57] ABSTRACT

The invention relates to a method and apparatus for color matching of slightly colored objects which are transparent, diffusing an absorbent, by acuminating a small error of the objects with a first bunch of optical fibers. A second bunch of optical fibers is used to pick up the light back scattered from the area of the objects. The second fibers are located inside of the illuminating fibers. The light is measured at 3 wavelengths that correspond to blue, green and red colors and the pigmentation of the object is calculated as a difference between the red and blue spectrum components. Presentation of the brightness is calculated to be proportional to the green spectrum component. The pigmentation and brightness is then compared with the same perimeters of a standard shape pallet. The invention is particularly suitable for color matching the teeth in the mouth with dental prosthesis and dental restorative materials.

12 Claims, 7 Drawing Sheets

OTHER PUBLICATIONS

R. Goodkind et al, "Use of a Fiber–Optic Colorimeter for in Vivo Color Measurements of 2830 Anterior Teeth", J. Prosth. Dent., vol. 58, pp. 535–542, 1987.

R. Seghi, et al., "Performance Assessment of Calorimetric Devices on Dental Porcelains", J. Dent. Res., vol. 1755–1759, 1989.

V. Burgt, et al., "A Comparison of New and Conventional Method for Quantification of Tooth Color", J. Prosth. Dent., vol. 63, pp. 155–162, 1990.

R. Seghi, "Effects of Instrument–Measuring Geometry on Calorimetric Assessment of Dental Porcelains", J. Dent. Res., vol. 69, pp. 1180–1183, 1990.

G. Goldstein et al. Repeatability of a Specially Designed Intraoral Colorimeter:, J. Prosth. Dent., vol. 69, pp. 616–619, 1993.

R. Bolt, "Influence of Window Size in Small–Window Colour Measurement, Particularly of Teeth", Phys. Med. Biol., vol. 39, pp. 1133–1145, 1994.

N. Ishikawa et al., "Using a Computer Color–Matching System in Color Reproduction of Porcelain Restorations. Part 3: A Newly Developed Spectrophotometer Designed for Clinical Application.", Int. J. Prosth., vol. 7, pp. 50–55, 1994.

J. Bosch, et al., "Tooth Color and Reflectance as Related to Light Scattering and Enamel Hardness.", J. Dent. Res., vol. 74, pp. 374–380, 1995.

D. Fried, et al., "Nature of light scattering in dental enamel and dentin at visable and near–infrared wavelengths." Appl. Opt., vol. 34, pp. 1278–1285, 1995.

METHOD AND APPARATUS FOR COLOR MATCHING OF SLIGHTLY COLORED TRANSLUCENT OBJECTS SUCH AS TEETH AND DENTAL PROSTHESIS, IN PARTICULAR

FIELD OF THE INVENTION

The invention relates to a method and apparatus for color matching of slightly colored objects which are transparent, diffusing, and absorbent, such as teeth in the mouth and dental prosthesis, in particular.

BACKGROUND OF THE INVENTION

Various proposals have already been made to perform such color matching by illuminating the surface of the object or the tooth with polychromatic light, by picking up the light scattered by said object or said tooth, and by analyzing the spectrum of the light picked up, in particular to determine the spectral reflectance of the object or of the tooth.

In principle, such spectral reflectance data can provide a reliable color matching of a dental prostethis that is implanted next to the tooth on which measurement of reflectance has been performed, or color matching of series of objects reproducing the object on which the measurements have been performed. However, in practice, implementing that known technique allows high discrepancies between color of native teeth in the mouth and dental prosthesis which was found to be best matched or between an object and the reproductions of said object.

These discrepancies are due, firstly, to the attempts of color matching of slightly colored translucent objects by measuring their color in a wide range of chroma as it is used conventionally in most of the colorimetric methods and apparatus, and secondly, to illuminate a large surface of the tooth or object to be reproduced that leads, because of translucency, to light spread in a large area which causes the color averaging and to light leakage from the object which leads to lower measured brightness of the tooth or object to be reproduced.

The color of vital human teeth is a result of complex optical phenomena which include not only reflection and light scattering on the tooth surface but selective light absorption, light scattering inside the tooth and light reemission as well. The thickness of the tooth and blood supply are additional physiological factors which affect the color matching since the color of a tooth varies from gum to edge. As well a lot of teeth are spotted, e.g. they have small white spots which are in high contrast with the surrounding uniform tooth color. Therefore, it is necessary to perform color matching in different places of a front tooth surface to achieve the better total color matching. Present calorimetric and spectroscopic methods were based on the diffuse illumination of a large tooth area (more than 5 mm in diameter).

Slightly colored translucent objects such as teeth have small variations of chroma. They are classified normally as white, yellowish, reddish and brownish, but they have a lot of grades within each class which observer sees as a different hue. Therefore, it is necessary to develop a method of measurement which will be sensitive to very small changes of hue within a narrow range of colors instead of nonsensitive measuring in the full range of colors. We have found that more sensitive measurements can be accomplished by decreasing the number of measuring parameters and by using the distinctive behavior of a reflectance spectrum which most of all determines the color. This behavior consists of monotonous increase of spectral reflectance of the tooth in the visible range of wavelengths from 400 nm to 700 nm. The higher coloration of the teeth corresponds to larger difference between reflectance measured at long and short wavelengths. At the same time, the total reflectance of the tooth that is described as a tooth brightness, is proportional to the reflectance measured at green band of visible spectrum that is close to 550 nm and corresponds to maximum spectral sensitivity of human eye.

OBJECTS AND SUMMARY OF THE INVENTION

A particular objective of the method and apparatus for color matching of slightly colored translucent objects such as teeth and dental prosthesis, in particular, is to facilitate the implementation of that method and its use by dentists to determine dental prosthetic and restorative materials with the best color matching to native human teeth and/or by dental technicians to perform the appropriate dental prosthesis.

Another object of the invention is to-provide a method and apparatus enabling the color of a slightly colored translucent object to be matched simply and reliably, taking into account local color changes with great accuracy and without risk of manipulation error.

To this end, the invention provides a method of better color matching slightly colored objects which are transparent, diffusing, and absorbent, in particular teeth in the mouth. The method consists of illuminating a small area of the object by means of optical fibers, by picking up the light backscattered from the said area of the object by means of a second optical fiber system which is inside of fiber illuminating system, by measuring said light at wavelengths corresponding to blue, green and red colors, by calculating of pigmentation as a difference between red and blue spectral components, by presenting the brightness to be proportional to green component, and by comparing pigmentation and brightness with the same parameters of a standard shade palette.

In accordance with the invention, the backscattered light is analyzed at three wavelengths which correspond to blue, yellow-green (that is in the middle of the visible range) and red colors; these wavelengths are 400 nm, 550 nm and 700 nm, respectively. By choosing these wavelengths, the apparatus can achieve maximum sensitivity to small hue changes since reflectance of slightly colored translucent objects, such as teeth in particular, is changed significantly in this range. Previously proposed methods are based on analyzing several spectral components in the range of 440 nm to 600 nm, which is significantly shorter than the range of present invention. Therefore, current methods do not account for a considerable part of the blue light produced mostly by the fluorescence of the live tooth and part of the red light of wavelengths longer than 600 nm which causes the reddish hue of the tooth. Methods based on the colorimetric measurements, cover the full visible range, but at the same time they are not sensitive enough to small hue changes of slightly colored translucent objects since most of their tristimulus values corresponds to transitions between the primary colors, i.e. in the vicinity of the wavelengths at the intersections between the curves of the distribution coefficients $\bar{x}$, $\bar{y}$ and $\bar{z}$ of the standard CIE observer.

The present invention is thus not based on measuring the color of the object, but on determining the pigmentation factor of the object which is apparent as a hue, and the saturation factor which is apparent as the brightness of the object. Such determining is possible because of differences in the chroma of slightly colored translucent objects, such as teeth can be negligible, and spectral reflectance increases monotonously in the visible range.

By illuminating a small area of the object (diameter less than 0.5 mm) and picking up the light from the same small area, it is possible to perform color matching in each small zone of the object which have different pigmentation and brightness, and reproduce the same variations of pigmentation and brightness in replica. Proposals have already been made for dental color measurement with illuminating area more than 5 mm in diameter. Such large illuminating area sometimes exceeds the size of the tooth, does not allow to perform a local color matching, and leads to light leakage through the side surfaces of the tooth decreasing the saturation level or brightness.

According to another characteristics of the invention, the main optical system of the apparatus comprises two optical fiber systems: one of them is for illuminating the object and another, designed to be coaxialy to first one is for picking up the backscattered light. By using optical fiber systems, it is possible to minimize risk of manipulation error, in particular when the object is a tooth in the mouth, and to put the illuminating and receiving optical systems in a small handpiece.

Conventional colorimetric apparatus consist of integrated sphere which aimed to perform a diffuse uniform illumination of the measured object. In another proposals, inner surface of opto-mechanical apparatus covered by light scattered material serves as an integrated sphere. The integrated sphere is not used in present invention. The uniform light illumination is achieved by two factors which were not presented in previous proposals. Firstly, light is uniformly mixed in the illuminating fibers which are normally from 1.5 m to 3 m long. Because the distal tips of the illuminating fibers are circularly positioned around the central receiving fiber system, they illuminate the object symmetrically from different directions. Secondly, light penetrates in the translucent object such as a tooth at a depth of several millimeters, where it is highly scattered and become even more spatially uniform.

Distal tips of the illuminating fibers are designed, in present invention, to have a spherical shape with the center of sphere coinciding with central optical axis of the receiving optical fibers. Illuminating light is focused at the object surface by such spherical end reducing the illuminating area. To collect more backscattered light, the receiving fibers are displaced from the object surface at a distance which is equal to a focal length of the focusing spherical end. Radii of fibers, focal length of the spherical tip and the distance between the illuminating and receiving fiber bands are chosen to cut all light beams specularly reflected from the object surface. Another way to eliminate the specular component of reflected light is to use a spatial displacement between distal ends in illuminating and receiving fibers along the optical axis. For this purpose, the distal end of illuminatng fibers should be shifted from the end of receiving fibers at the distance of about 1 . . . 3 mm.

Optical fibers are as reliable as lenses in respect of aging and coupling. They have negligible light losses for length of several meters. Moreover, because of coaxial design, they illuminate uniformly much smaller area of object surface to compare with optical lens system coupled with an integrated sphere.

Finally, the apparatus includes a removable endpiece comprising a base for fixing the distal end of the handpiece and designed to be applied against the object to delimit a distance between the object and the receiving fiber tip. This endpiece of simple cylindrical shape makes it easier to use the apparatus and it improves the manipulation procedure and accuracy of the color matching.

The apparatus is designed to work in a contact mode. It means that distal end of receiving fibers or removable endpiece are in contact with tooth surface in order to perform better positioning of handpiece. If receiving fibers are in contact with tooth, the distal end of the fibers is rounded. It reduces the influence of tooth surface waviness on the readout.

Other objects, features and advantages of the present invention will become apparent upon study of the following detailed description taken in conjunction with the drawings.

BRIEF DESCRIPTION OF THE DRAWINGS

An embodiment of the invention is described by way of example with reference to the accompanying drawings, in which.

MORE DETAILED DESCRIPTION

Figure 1:
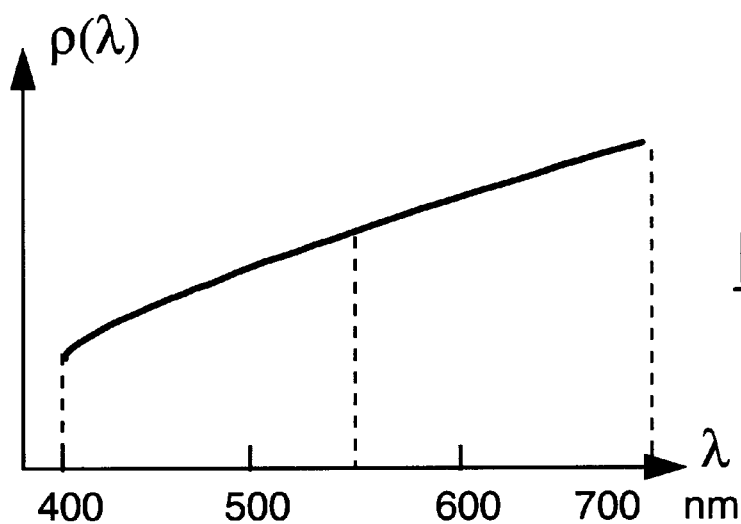
FIG. 1 is a graph showing the typical view of the spectral reflectance of the tooth.

Human teeth are slightly colored translucent objects with monotonous function of spectral reflectance increasing from blue to red light region as it shown in FIG. 1. This spectral increase can be described by a slope of the curve $\rho(\lambda)$ to axis $\lambda$, where $\rho(\lambda)$ is the spectral reflectance of the tooth, Most native teeth have very smooth function $\rho(\lambda)$ that determines a characteristic slightly colored view of the teeth. Smooth character of the function $\pi(\lambda)$ allows to present an average slope of the curve $\pi(\lambda)$ as a difference between the red spectral component (wavelength in the range of 700 nm where function $\rho(\lambda)$ still increases) and blue spectral component (wavelength in the range of 400 nm which corresponds to beginning of the visible range for standard observer).

Figure 2:
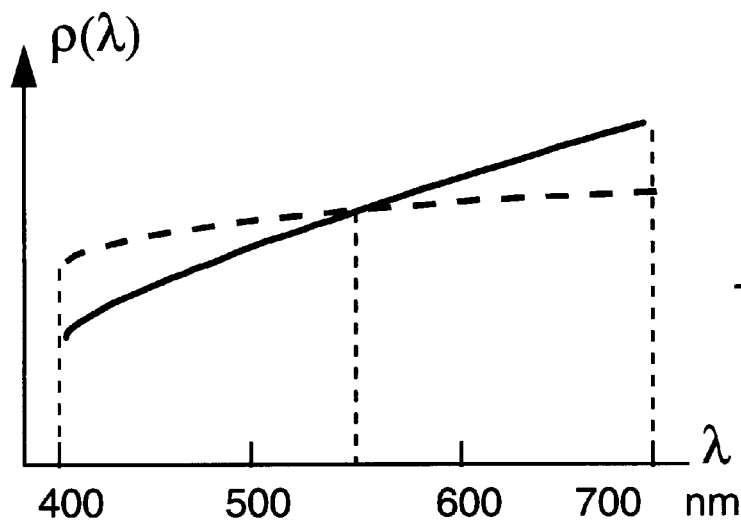
FIG. 2 is a graph showing the spectral reflectance of two teeth with different pigmentation and the same total reflectance or saturation.

This difference characterizes a relative pigmentation of the tooth, namely, higher pigmented tooth which normally looks yellowish or brownish has higher difference between red and blue components to compare with white tooth which has smaller difference (slope of function $\rho(\lambda)$ is smaller, as it is shown in FIG. 2, dashed line).

Figure 3:
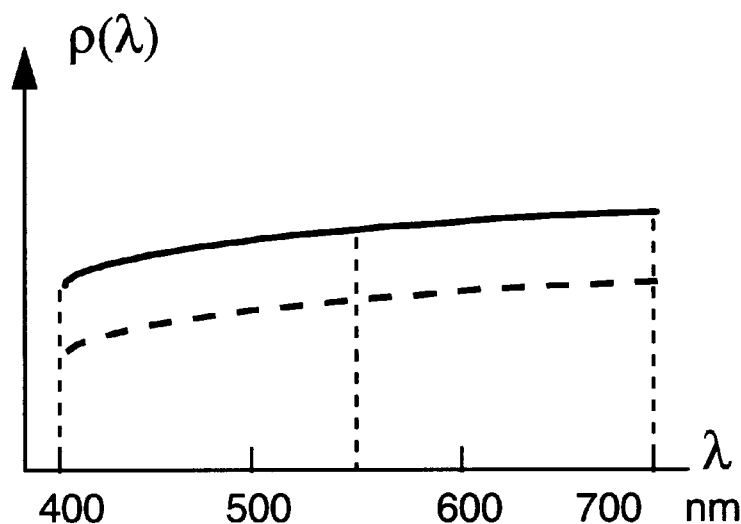
FIG. 3 is a graph showing the spectral reflectance of two teeth which are differed by different saturation value whereas they have the same pigmentation.

Teeth with the same pigmentation can be saturated if they have different total reflectance in the visible range. This parameter describes an average position of the curve $\rho(\lambda)$ above the axis $\lambda$. The tooth looks darker if it has lower spectral reflectance $\rho(\lambda)$ in all visible range. Its function $\rho(\lambda)$ locates under the curve $\rho(\lambda)$ for lighter tooth (dashed and solid lines in FIG. 3, respectively).

Figure 4:
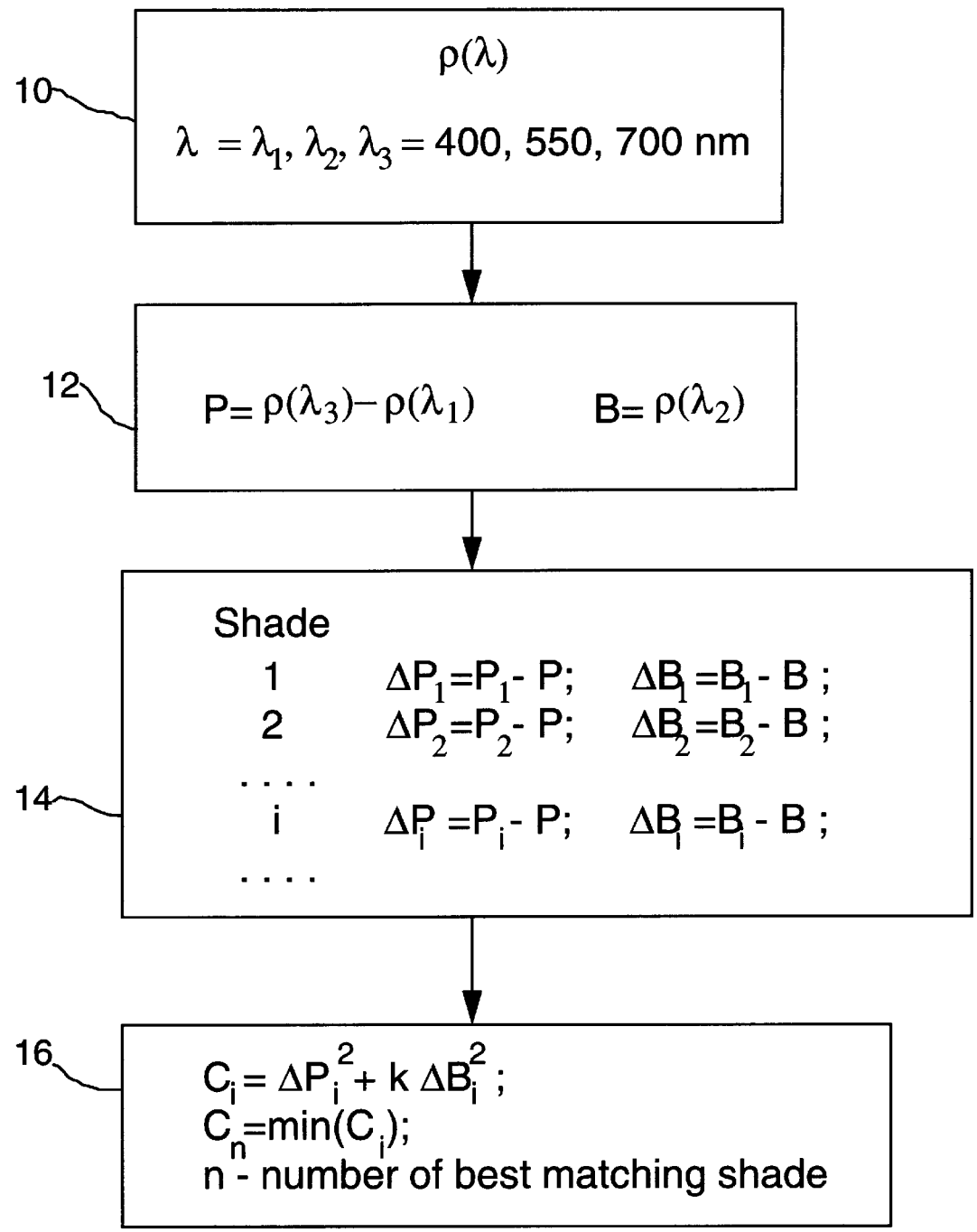
FIG. 4 is a flow chart outlining the essential operations of the method of the invention

FIG. 4 shows the main operations in the method of the invention as applicable to color matching a native tooth with dental prosthesis or restorative materials.

The first step given reference 10 consists of measuring reflectance of the tooth illuminated by a polychromatic light which spectral power density is close to daylight in the visible range (color temperature 5500 K.). This reflectance is measured at three well-determined wavelengths, namely $\lambda_1$=400 nm, $\lambda_2$=550 nm and $\lambda_3$=700 nm. The wavelength 400 nm corresponds to the left edge of the blue light region which presents not only blue light reflected and scattered inside of the tooth, but some amount of fluorescent light as well. The wavelength 700 nm corresponds to the middle edge of the red light region where the reflectance increase is ended. For longer wavelengths, the reflectance is not changed significantly. The wavelength 550 nm is in the middle between 400 nm and 700 nm, it belongs to the region where reflectance is almost independent on pigmentation and it is close to maximum spectral sensitivity of human eye. The reflectance at 550 nm mostly depends on saturation or brightness of the tooth.

On the basis of these three measurements, the pigmentation and saturation of the tooth is determined in a step 12. The pigmentation value P is calculated as a difference between reflectance measured at 700 nm and 400 nm:

$$P=\rho(\lambda_3)-\rho(\lambda_1)$$

The brightness value is assumed to equal reflectance measured at $\lambda_2$=550 nm:

$$B=\rho(\lambda_2)$$

The following step 14 of the method of the invention consists of determining all differences $\Delta P_i$, $\Delta B_i$ between pigmentation and brightness data $P_i$, $B_i$ measured by the same apparatus previously from i-shade standard dental prosthesis and data P, S from measured tooth, respectively:

$$\Delta P_i = P_i - P$$

$$\Delta B_i = B_i - B$$

Data $P_i$, $B_i$ are stored in a data processor system for all known series of standard dental palettes.

During the next step 16 of the method of the invention, number of shade n with parameters $P_n$ and $B_n$ which is most close to measured values P and B is determined. This number is determined by the minimization of the parameter $C_i$ which presents a sum:

$$C_i = \Delta P_i^2 + k \Delta B_i^2$$

The correction coefficient k varies from 0.1 to 1.0 depending on type of the standard shade material (porcelain, plastic, composite) and manufacturer because different restorative materials have different relations between pigmentation and saturation. All k values are determined previously during the calibration stage for all shade palettes.

The number n of the best color matching shade corresponds to the number of a minimum element $C_i$.

$$C_n = \min(C_i)$$

The number n is connected to the conventional name of the shade palette, like B58, B66, A3, D4, etc.

Figure 5:
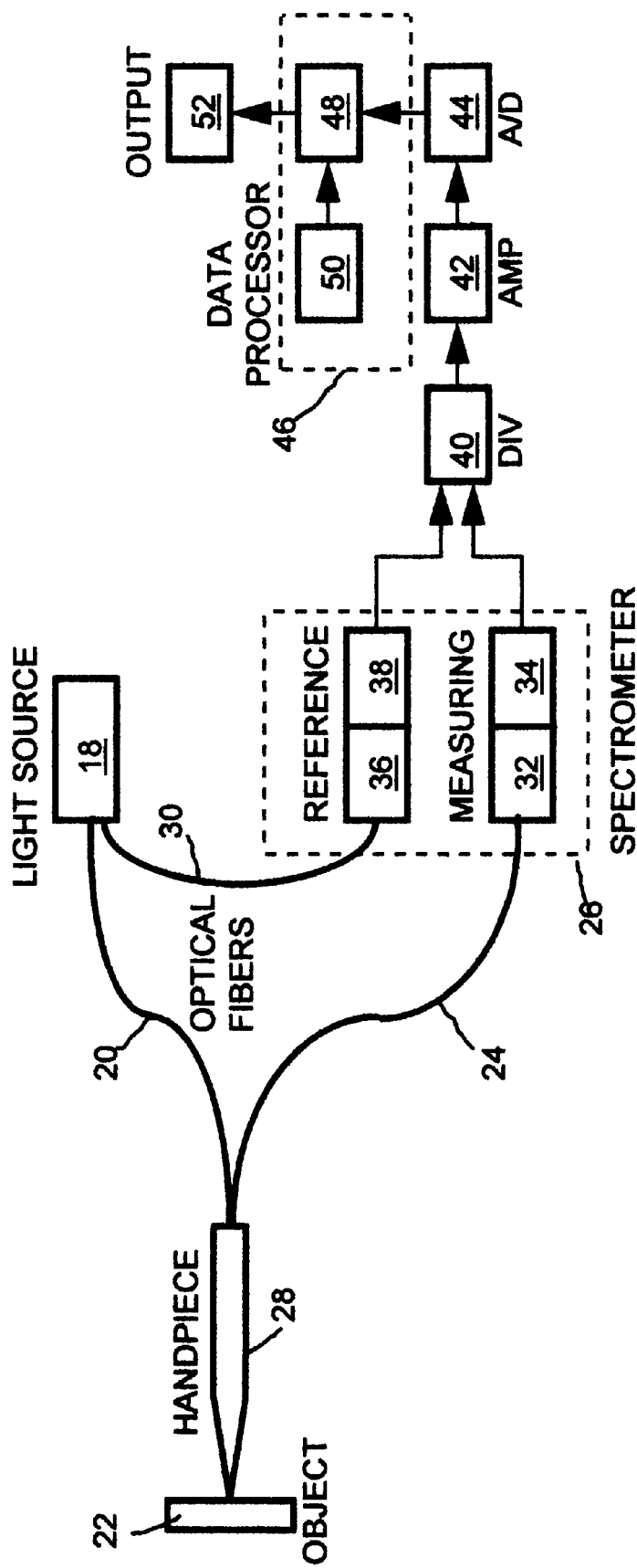
FIG. 5 is a block diagram showing the essential components of the apparatus of the invention.

The method of the invention is implemented by means of apparatus such as that shown in FIG. 5, which apparatus comprises a source 18 of polychromatic light associated with the illuminating optical fibers 20 for illuminating an object 22 such as a tooth in the mouth or object to be reproduced. The light, penetrating into the object and scattered inside of it, is taken up by receiving fibers 24 and transmitted to the spectrometer 26. Distal ends of the illuminating and receiving fibers are held in handpiece 28. The light source 18 is associated with a spectrometer 26 directly by the reference optical fibers 30. The spectrometer 26 has two parts: measuring part having a measuring spectroscopic unit 32 and photodetectors 34 at its outlet, and reference part having the same spectroscopic unit 36 and photodetectors 38 at its outlet. Outputs of the photodetectors are connected to the dividers 40. Amplifier circuits 42 connect the outputs of the dividers 40 to an analog-to-digital converter 44 whose output is connected to an input of the data processor system 46, e.g. of the microprocessor type, comprising a microprocessor 48 associated with a memory 50 and with an output peripheral unit 52 such as a printer and/or a display screen.

The reference part serves to avoid the influence of the change of light source spectrum with time and power supply by measuring the spectral reflectance as a ratio between light reflected from the object and light directed to the object. Initial calibration of the device is performed by using a standard white translucent object with thickness more than maximum light penetration depth. This depth is about 5 mm for red light. Optical fiber systems 20, 24 and 30 are designed in such way that light intensity at the same wavelength is the same in the reference and measuring parts during the calibration.

Figure 6:
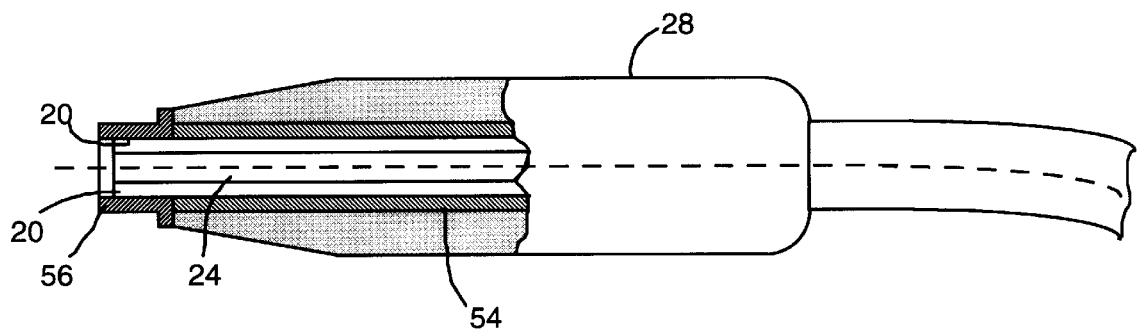
FIG. 6 is a diagrammatic axial section view through the handpiece.
Figure 7:
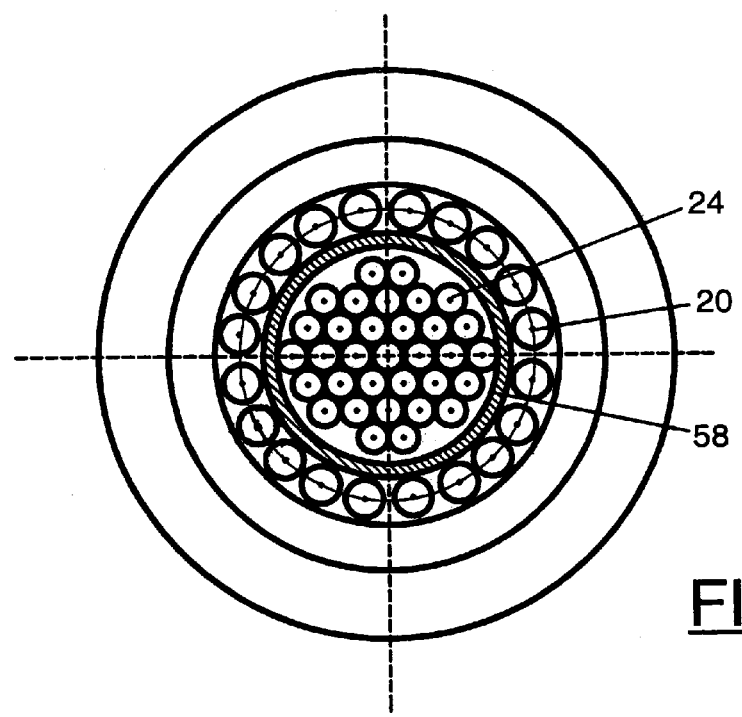
FIG. 7 is a front view of the distal end of the handpiece.
Figure 8:
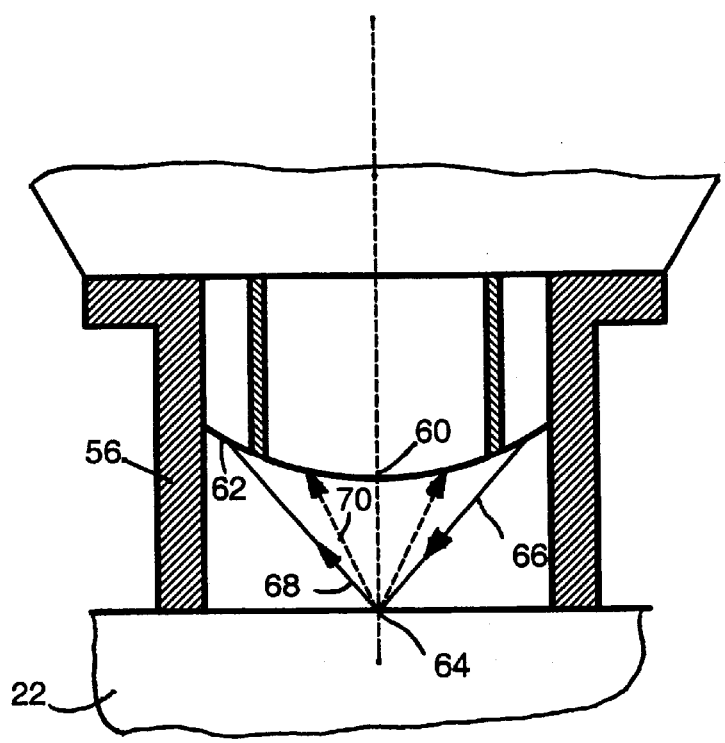
FIG. 8 is a diagrammatic axial section view on a larger scale of the distal end of the handpiece.
Figure 9:
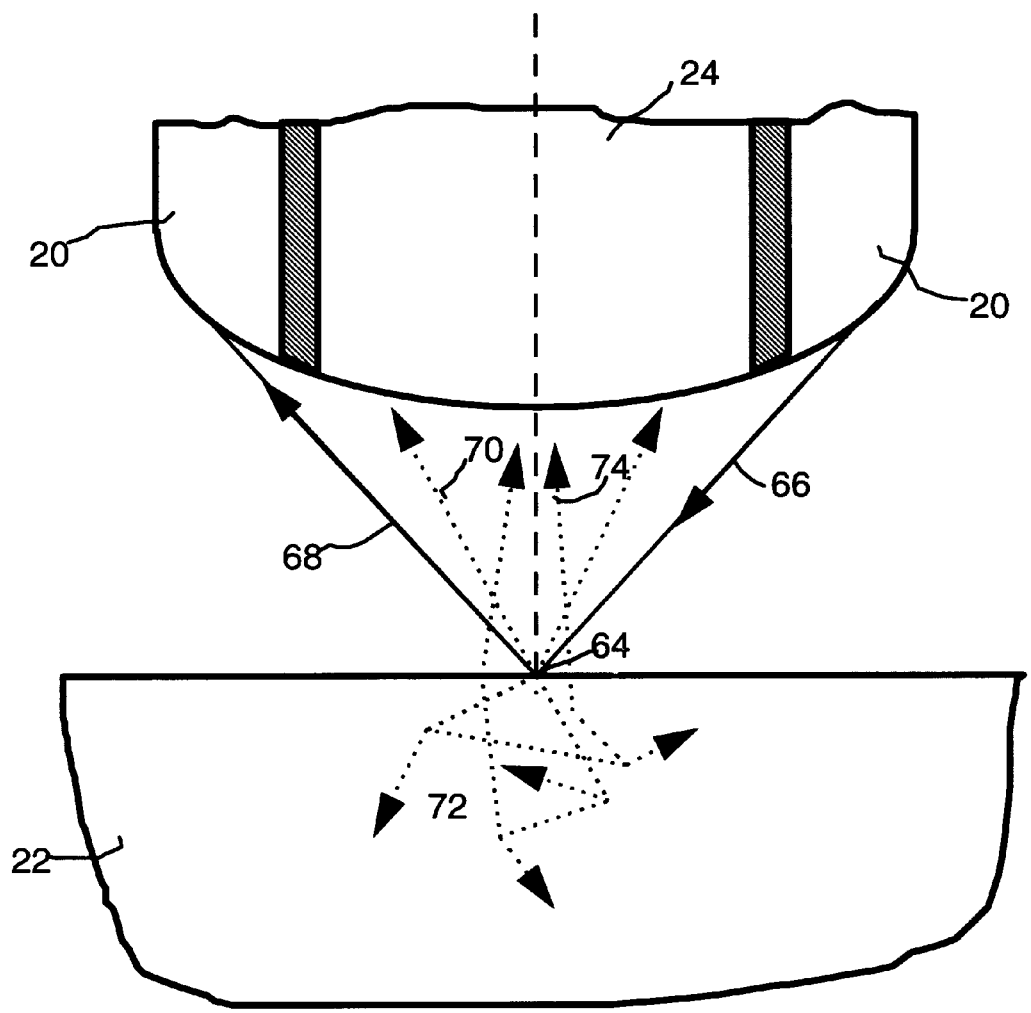
FIG. 9 is a schematic presentation of light beams near the object surface.
Figure 10:
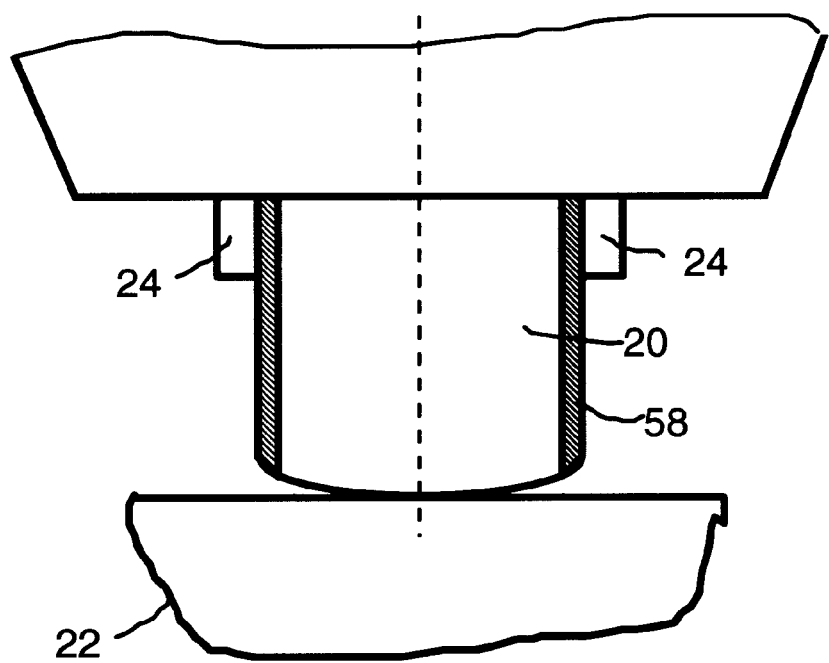
FIG. 10 is a diagrammatic axial section view of the distal end of the handpiece with shifted illuminating fibers from the end of receiving fibers.

The handpiece 28 which axial cross section is presented in FIG. 6 consists of fiber holder 54 inside of which illuminating fibers 20 and receiving fibers 24 are positioned coaxially as it is shown in FIG. 7. Near the distal end of the handpiece, the illuminating and receiving fibers are separated by a jacket 58 which prevents light leakage from one group of fibers to another. The thickness of the jacket 58 is about one radius of illuminating fiber. Removable hollow endpiece 56 is attached to the distal end of the handpiece. Its inner diameter is close to outer diameter of the illuminating fiber band and its length is designed to delimit a distance between the fiber tip 60 and light spot 64 at the object surface 22. This distance equals to the focal length of the spherical fiber tip 62 as it is shown in FIG. 8. The ends of the fibers 20 and 24 are design in such a way as a dark field system which is shown in FIG. 9. In this system, part of irradiating beams 66 specularly reflected from the object surface is separated from the beams 70 scattered on the object surface and beams 72 and 74 scattered inside of the object. The beams 66 are directed back to the illuminating fibers or to the front surface of the jacket 58 or to the inner surface of the endpiece 56. For better spatial separation of diffuse reflected light, the distal end of illuminating fibers 20 can be shifted at the certain distance from the end of receiving fibers 24 as it is shown in FIG. 10.

The apparatus operates as follows:

The endpiece 56 mounted at the distal end of the handpiece 28 is applied to the surface of the object whose color is to be matched with standard color palette shade. By powering the light source 18, the light flux is directed to the illuminating fiber bundle 20 and reference fiber bundle 30. Because of long length of illuminating fibers (more than 1.5 m), the light distribution at the distal end of the fibers is isotropically uniform within the angular aperture of the fibers. The output light is focusing by the spherical fiber tip 60 to a small light spot 64 at the object surface 22. For outer diameters of receiving and illuminating fiber ends of 1.0 mm and 2.0 mm, respectively, radius of focusing sphere of 2.0 mm and refractive index of illuminating fibers of 1.50, the diameter of light spot is about 0.5 mm.

Specularly reflected light flux 68 which is highly dependent on object profile is directed back to the illuminating fibers 20 or/and absorbed on the front end of the jacket 58 and inner surface of the removable endpiece 56. Light scattered at the object surface (beams 70) and scattered inside of the object (beams 74) are collected by receiving fibers 24 and directed to the spectroscopic unit 32 which selects spectral components corresponding to three wavelengths: 400 nm, 550 nm and 700 nm. These components are registered separately by photodetectors 34 producing the signals $U_{meas}(\lambda)$. The same spectral selection is performed by spectroscopic unit 36 and photodetectors 38 giving the signals $U_{ref}(\lambda)$ with light directed from the light source 18 via reference optical fibers 30. Each pairs of the signals $U_{ref}(\lambda)$ and $U_{meas}(\lambda)$ corresponding the same wavelength from reference and measuring channel is sent to the divider 40 where the appropriate reflectance coefficient $\rho(\lambda)$ is calculated as the ratio:

$$\rho(\lambda) = U_{meas}(\lambda)/U_{ref}(\lambda)$$

The divider 40 is adjusted to perform the value of reflectance coefficient $\rho(\lambda)$ to be equal 1.0 if apparatus is applied to a calibrated standard translucent object.

Signals from divider are amplified by amplifier 42 to proper level which is necessary for the analog-to-digital converter 44 and directed to the microprocessor 48 where pigmentation value P and brightness B are calculated. By using the stored data of P, B and correction coefficient k from memory 50, microprocessor also determines the number of the standard shade which has the closest P and B values. This number is displayed on the output peripheral unit 52. In case of tooth, for example, this number looks like B58, B66, A3, D4, etc., e.g. number which is commonly used to identify the dental shade. Additionally, this number can present a percentage of dyes which should be added to the dental material to perform the prosthesis of the best color matching with measured tooth.

The light source 18 may be a halogen lamp or flash lamp or a discharge lamp and it preferably emits light that spectrally corresponds to daylight in the visible range (color temperature 5500 K.). The reference channel is used to avoid effect of aging in the lamp and optical fibers, and accidental dirtying of the fiber distal end.

We claim:

1. An apparatus for color matching of slightly colored translucent objects, using diffuse spectroscopy, said apparatus comprising:
   a source of polychromatic light;
   a first set of optical fibers having a first end connected to said source of polychromatic light and a second end connected to a handpiece so as to pass light to said objects;
   a second set of optical fibers having a first end connected to a spectrometer and a second end connected to said handpiece, wherein said second set of optical fibers collects diffuse light scattered from said objects;
   a third set of optical fibers connecting said source of polychromatic light to said spectrometer;
   said spectrometer comprising a first measuring part having a measuring spectroscopic unit and measuring photo detectors at an outlet and a reference part having a reference spectroscopic unit and reference photo detectors at an outlet;
   wherein said measuring and reference photo detectors are connected to a microprocessor system programed to determine, on the basis of output from said photo detectors, a pigmentation value of the objects as a function of a difference in reflectance measured between red and blue spectral components of said objects and brightness of said objects as defined by reflectance measured at a green spectral component of said objects, as measured relative to a standard reference source;
   said microprocessor system further programed to determine, on the basis of said brightness and pigmentation values, a standard shade material corresponding to said translucent objects.

2. The apparatus of claim 1 wherein said translucent objects comprise teeth.

3. The apparatus of claim 2 wherein said blue spectral component is measured at a wavelength of 400 nanometers, said green spectral component is measured at a wavelength of 550 nanometers and said red spectral component is measured at a wavelength of 700 nanometers.

4. The apparatus according to claim 2 wherein said first set of fibers are located coaxially around said second set of fibers, within said handpiece.

5. The apparatus of claim 4 wherein said second end of said first set of fibers is positioned in a plane located a distance along an optical axis from said second end of said second set of fibers.

6. The apparatus according to claim 4 wherein said second end of said first set of fibers has a spherical shape so as to focus said light on said objects.

7. The apparatus of claim 6 wherein a centre of said spherical shape is coincident with an optical axis of said second set of fibers.

8. The apparatus according to claim 6 further comprising a removable hollow end piece, said end piece comprising a base for fixing on an end of said handpiece and constructed so as to be applied against said objects in order to delimit a distance between said second end of said second set of fibers and said object which distance is equal to a focal length of said spherical shape.

9. The apparatus of claim 5 wherein said distance is in the range of 1 to 3 millimeters.

10. A diffuse spectroscopy method of matching color or slightly colored translucent objects and prosthesis, said method comprising the steps of:
    illuminating said objects by means of a light source and illuminating optical fibers;
    collecting diffuse light scattered light from said objects by means of receiving optical fibers;
    collecting said diffuse scattered light in a spectrometer;
    measuring said diffuse scattered light at three predetermined wavelengths corresponding to blue, green and red spectral components;
    measuring a pigmentation of value of said objects by taking the difference in reflectance between measurements at said red spectral component and said blue spectral component;
    measuring a brightness value of said objects by taking a measurement at said green spectrum component;
    comparing said pigmentation and brightness values with a predetermined set of values for pigmentation and brightness of said prosthesis, to define a comparative value for pigmentation and a comparative value for brightness; and
    selecting an appropriate prosthesis having a minimal comparative value for pigmentation and a minimal comparative value for brightness.

11. The method of claim 10 wherein said translucent objects are teeth.

12. The method of claim 11 wherein said red wavelengths are 400 nanometers at said blue spectral component, 550 nanometers at said green spectral component and 700 nanometers at said red spectral component.

* * * * *